United States Patent [19]

Chattha

[11] 4,237,241

[45] * Dec. 2, 1980

[54] COATING COMPOSITIONS INCLUDING HYDROXY PHOSPHATE CATALYST

[75] Inventor: Mohinder S. Chattha, Livonia, Mich.

[73] Assignee: Ford Motor Company, Dearborn, Mich.

[*] Notice: The portion of the term of this patent subsequent to Jan. 1, 1980, has been disclaimed.

[21] Appl. No.: 945,027

[22] Filed: Sep. 22, 1978

[51] Int. Cl.$^3$ .................... C08L 63/00; C08L 61/20
[52] U.S. Cl. .................... 525/110; 260/37 EP; 260/37 M; 260/39 R; 525/161; 525/162
[58] Field of Search .............. 260/834, 851; 525/162, 525/161, 110

[56] References Cited

U.S. PATENT DOCUMENTS

| | | | |
|---|---|---|---|
| 2,528,359 | 10/1950 | Greenlee | 260/834 |
| 2,528,360 | 10/1950 | Greenlee | 260/834 |
| 2,541,027 | 2/1951 | Bradley | 260/834 |
| 2,732,367 | 1/1956 | Shokal | 260/834 |
| 2,849,418 | 8/1958 | Fang | 260/836 |
| 3,133,838 | 5/1964 | Higgins | 260/837 R |
| 3,198,850 | 8/1965 | Levantin | 260/834 |
| 3,260,622 | 7/1966 | Suer | 526/13 |
| 3,524,903 | 8/1970 | Hargis | 260/837 R |
| 3,651,169 | 3/1972 | Davis | 260/834 |
| 3,901,840 | 8/1975 | Irvin | 260/851 |
| 3,919,352 | 11/1975 | Iwasawa | 260/851 |
| 3,936,416 | 2/1976 | Brady | 260/42.18 |
| 3,947,528 | 3/1976 | Wingler | 260/851 |
| 3,960,979 | 6/1976 | Khanna | 260/834 |
| 4,002,699 | 1/1977 | Labana | 260/851 |
| 4,018,848 | 4/1977 | Khanna | 260/834 |
| 4,027,066 | 5/1977 | Victorius | 260/834 |
| 4,055,607 | 10/1977 | Sullivan | 260/834 |

*Primary Examiner*—Paul Lieberman
*Attorney, Agent, or Firm*—Roger L. May; Olin B. Johnson

[57] ABSTRACT

An improved thermosetting coating composition of the type comprising a film forming component and an amine aldehyde compound, wherein the composition cures by reaction between the amine aldehyde compound and hydroxy functionality present on the film forming material. The improvement comprises including in the composition a catalyst comprising at least one hydroxy functional organophosphate ester selected from certain mono- and diesters of phosphoric acid.

10 Claims, No Drawings

COATING COMPOSITIONS INCLUDING HYDROXY PHOSPHATE CATALYST

BACKGROUND OF THE INVENTION

This invention relates to coating compositions of the type comprising a film forming component and an amino compound, wherein the composition cures by reaction between the amino compound and hydroxy functionality present on the film forming material. More particularly, the invention relates to thermosetting coating compositions of the aforementioned type wherein the composition includes a catalyst for the hydroxy/amino curing reaction comprising at least one hydroxy functional organophosphate ester selected from certain mono- and diesters of phosphoric acid.

Thermosetting coating compositions which cure by reaction of hydroxy functionality with an amino compound are well known in the art. It is also well recognized in the art that it is desirable to catalyze the hydroxy/amino crosslinking reaction in order to attain a quicker and more complete cure of the coating composition. To this end, catalysts for this reaction have been developed and are also well known.

SUMMARY OF THE INVENTION

It has been discovered that thermosetting coating compositions of the aforementioned type wherein the crosslinking reaction consists essentially of a reaction between hydroxy functionality and an amino compound are significantly improved when catalyzed by a catalyst comprising at least one hydroxy functional organophosphate ester having a formula:

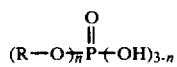

wherein n=1 to 2 and R is selected from the group consisting of mono- or dihydroxy alkyl, cycloalkyl or aryl radicals. In particular, it has been found that such hydroxy functional organophosphate catalyzed compositions exhibit rapid cure at low temperature and produce coatings with superior properties. In addition, the hydroxy functional organophosphate catalyst does not become involved in deleterious side reactions as is the case with many conventional catalysts and has the further advantage of not leaching out of the coating composition after curing is completed.

More specifically, the catalyzed coating compositions of the invention include the broad class of thermosetting compositions wherein hydroxy functionality of the film forming component, which hydroxy functionality is either initially present, generated in situ, or both initially present, and generated in situ, is crosslinked with conventional amino functional crosslinking agents. As will be more fully described hereinafter, the hydroxy functionality which may be generated in situ may be generated in any manner known to the art with respect to this type of composition or it may be generated by a reaction between the catalyst itself and functionality in the film forming material, in particular, between the catalyst and epoxy functionality in the film forming material. In this case, the catalyst serves as a reactant which helps generate the hydroxy functionality subsequently engaged in the crosslinking reaction with the amino compound.

The invention will be more fully understood from the following detailed description of the invention and the examples.

DETAILED DESCRIPTION OF THE INVENTION

As discussed generally above, the coating compositions of the invention are thermosetting materials comprising a film forming material bearing hydroxy functionality which is either initially present in the composition or which is formed by in situ reaction, an amino compound crosslinking agent, and the improved catalyst of the invention comprising at least one hydroxy functional organophosphate ester selected from certain mono- and diesters of phosphoric acid. Each of the components of the coating compositions within the scope of the invention are described hereinafter in greater detail.

Organophosphate Ester

As mentioned above, the improvement in the invention resides in the use of a particular catalyst comprising at least one hydroxy functional organophosphate ester. This novel hydroxy functional organophosphate ester is present in the composition as a mono- or diester of phosphoric acid or as a mixture of such mono- and diesters. The hydroxy functional organophosphate esters useful in the composition of the invention are those having the formula:

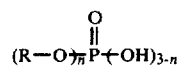

wherein n=1 to 2 and R is selected from the group consisting of mono- or dihydroxy alkyl, cycloalkyl, or aryl radicals. Preferably, the hydroxy bearing alkyl, cycloalkyl, or aryl radicals contain 3 to 10 carbon atoms.

Among the numerous suitable mono- or dihydroxy functional radicals are: 2-ethyl-3-hydroxyethyl; 4-methylol-cyclohexylmethyl; 2,2 diethyl-3-hydroxypropyl; 8-hydroxyoctyl; 6-hydroxyhexyl; 2,2 dimethyl-3-hydroxypropyl; 2-ethyl-2-methyl-3-hydroxypropyl; 7-hydroxyheptyl; 5-hydroxypentyl; 4-methylolbenzyl; 3-hydroxyphenyl; 2,3-dihydroxypropyl; 5,6-dihydroxyhexyl; 2-(3-hydroxycyclohexyl)-2-hydroxyethyl; and 2-(3-hydroxypentyl)-2-hydroxyethyl. The above radicals are intended to be only exemplary and numerous other radicals falling within the defined scope of the organophosphate esters useful in the compositions of the invention will be apparent to those skilled in the art. Among the most preferred radicals are mono- or dihydroxy functional alkyl radicals containing 3 to 10 carbon atoms.

A preferred method for preparing the hydroxyfunctional organophosphate esters useful in the compositions of the invention is by an esterification reaction between an excess of an alkyl, cycloalkyl or aryl diol or triol and phosphorus pentoxide. When a triol is used as a reactant, preferably at least one of the hydroxyl groups should be secondary. The reaction between the diol or triol and the phosphorus pentoxide is generally carried out by adding phosphorus pentoxide portionwise to an excess of diol or triol in a liquid state or in soluton in a suitable solvent.

Suitable solvents include, but are not limited to, butyl acetate, methyl ethyl ketone, methyl amyl ketone, toluene, xylene, etc.

A preferred temperature for carrying out the reaction is between about 50° C. and about 60° C. Due to the multiple hydroxy functionality of the diol or triol reactant, minor amounts of polymeric acid phosphate as well as certain cyclophosphates are also generated during the synthesis. These polymeric and cyclic materials also serve as a reactive catalyst and, therefore, need not be separated from the hydroxyphosphate esters described above. In fact, it has been found advantageous in preferred embodiments of the invention to employ all reaction products, i.e., the hydroxy functional organophosphate esters and the minor amount of polymeric acid phosphate, cyclophosphates, as well as excess diol or triol in the coating compositions. The excess diol or triol serves in those compositions as the optional hydroxy functional additive.

Reactive catalysts prepared by the above preferred method will generally include about a 1 to 1 ratio of the mono- and diester organophosphate.

Still another preferred method of preparing the hydroxy functional organophosphate esters useful in compositions of the invention is by an esterification reaction between phosphoric acid and an alkyl, cycloalkyl or aryl monoepoxide. This reaction is carried out by: adding between about 1 and about 2 moles, preferably between about 1 and about 1.5 moles of the monoepoxy material to 1 mole of phosphoric acid or its solution in a suitable solvent, as above. During the esterification reaction which occurs, a hydroxyl group is formed. If a dihydroxy radical is desired in the organophosphate ester, a monoeposide bearing hydroxy functionality may be used as a reactant. Preferred monoepoxide materials useful in this method are well known monoepoxides selected from monoepoxy ethers, monoepoxy esters and alkylene oxides. Exemplary of preferred monoepoxides for use in this esterification reaction are: propylene oxide, butylene oxide, cyclohexene oxide, styrene oxide, n-butyl glycidyl ether, ethyl glycidyl ether, n-butyl epoxy stearate and glycidyl acetate.

As will be understood by those skilled in the art, the proportion of monoester and diester formed by the reaction will vary with the selected molar ratio of the monoepoxide and the phosphoric acid. When 1 mole of monoepoxide is used per mole of phosphoric acid primarily monoester is formed while a molar ratio of 2 to 1 results in primarily diester. A molar ratio of 1.5 to 1 will result in an approximately 1 to 1 mixture of mono- and diesters. In all cases, a minor amount of the triester will be formed. While the triester obviously will not serve as a reactive catalyst, it will crosslink with the amino crosslinking agent of the composition and, thus, may be safely included.

The hydroxy functional organophosphate ester component of the thermosetting coating composition of the invention is a reactive catalyst which allows the composition to cure rapidly at a low temperature. In all cases, the hydroxy functionality present on the hydroxy functional organophosphate ester engages in the crosslinking reaction by reacting with the amino compound in addition to catalyzing the reaction between the amino compound and the hydroxy functionality present in the film forming materials. It is this reaction of the hydroxy functionality of the hydroxy functional organophosphate ester which probably accounts for the fact that the catalyst does not leach out of the finally cured composition. Thus, the catalyst serves not only to catalyze the reaction between the film forming material and the crosslinking agent, but also to more completely tie up the matrix of the composition and provide a more completely integrated crosslinked composition. In those embodiments of the invention wherein the film forming material also includes an epoxy material, either on the same compound as the hydroxy functionality or on a separate compound forming a part of the film forming material, the hydroxy functional organophosphate ester catalyst of the invention serves as a reactive catalyst in another sense. In this case, the acid functionality of the mono- or diester or mixture of such esters reacts with the epoxy functionality of the film forming material to form an ester and a hydroxyl group. This hydroxyl group, as well as the organic hydroxyl groups on the hydroxy functional organophosphate ester and the other hydroxy functionality which may be present in the film forming material is available for crosslinking with the amino crosslinking agent.

The amount of the hydroxy functional organophosphate catalyst which is included in the compositions of the invention will vary depending upon the nature of the film forming material employed and is a matter of choice which will be made by one skilled in the art.

Film Forming Material

As discussed above, film forming materials which either include hydroxy functionality initially, generate hydroxy functionality as a result of in situ reactions during the coating process or both include hydroxy functionality initially and generate it in situ, are well known to those skilled in the art. Selection of those materials will be a matter of choice and it will be recognized that the hydroxy functional organophosphate catalyst is equally applicable to all such hydroxy bearing film forming materials crosslinked with amino compound.

While it is intended that all such hydroxy bearing film forming materials be included within the scope of the invention, several of these materials will be discussed below in greater detail for purposes of exemplification.

As discussed above, the film forming material may consist essentially of a compound which bears hydroxy functionality prior to initiation of the curing reaction. In most coating compositions, such materials should have a number average molecular weight ($\overline{M}_n$) of at least 150. A preferred type of hydroxy functional material which meets these limitations consists essentially of a copolymer bearing pendant hydroxy functionality. One class of such materials has a number average molecular weight ($\overline{M}_n$) of between about 1000 and about 20,000 and a glass transition temperature (Tg) of between about −25° C. and about 70° C. Such a copolymer may, for example, consist of between about 5 and about 30 weight percent of monoethylenically unsaturated monomers bearing hydroxy functionality and between about 95 and about 70 weight percent of other monoethylenically unsaturated monomers.

The long list of hydroxy functional monomers which may be employed in these hydroxy functional copolymers includes, but is not limited to, the following esters of acrylic or methacrylic acid and aliphatic alcohols: 2-hydroxyethyl acrylate; 3-chloro-2-hydroxypropyl acrylate; 2-hydroxy-1-methylethyl acrylate; 2-hydroxypropyl acrylate; 3-hydroxypropyl acrylate; 2,3-dihydroxypropyl acrylate; 2-hydroxybutyl acrylate; 4-hydroxybutyl acrylate; diethyleneglycol acrylate; 5- hydroxypentyl acrylate; 6-hydroxyhexyl acrylate; triethyleneglycol acrylate; 7-hydroxyheptyl acrylate; 2-hydroxymethyl methacrylate; 3-chloro-2-hydroxypropyl methacrylate; 2-hydroxy-1-methylethyl methacrylate; 2-hydroxypropyl methacrlate; 3-hydroxypropyl methacrylate; 2,3-dihydroxypropyl methacrylate; 2-hydroxybutyl methacrylate; 4-hydroxybutyl methacrylate; 3,4-dihydroxybutyl methacrylate; 5-hydroxypentyl methacrylate; 6-hydroxyhexyl methacrylate; 1,3-dimethyl-3-hydroxybutyl methacrylate; 5,6-dihydroxyhexyl methacrylate; and 7-hydroxyheptyl methacrylate.

Although one of ordinary skill in the art will recognize that many different hydroxy bearing monomers incuding those listed above could be employed, the preferred hydroxy functional monomers for use in the hydroxy functional resin of the invention are $C_5$–$C_7$ hydroxy alkyl acrylates and/or $C_6$–$C_8$ hydroxy alkyl methacrylates, i.e., esters of $C_2$–$C_3$ dihydric alcohols and acrylic or methacrylic acids.

The remainder of the monomers forming the hydroxy functional copolymer, i.e., between about 90 and about 70 weight percent, are other monoethylenically unsaturated monomers. These monoethylenically unsaturated monomers, are preferably alpha, beta olefinically unsaturated monomers, i.e., monomers bearing olefinic unsaturation between the two carbon atoms in the alpha and beta positions with respect to the terminus of an aliphatic carbon to carbon chain.

Among the alpha-beta olefinically unsaturated monomers which may be employed in such copolymers are acrylates (meaning esters of either acrylic or methacrylic acids) as well as mixtures of acrylates and vinyl hydrocarbons. Preferably, in excess of 50 weight percent of the total of the copolymer monomers are esters of $C_1$–$C_{12}$ monohydric alcohols and acrylic or methacrylic acids, e.g., methylmethacrylate, ethylacrylate, butylacrylate, butylmethacrylate, hexylacrylate, 2-ethylhexylacrylate, laurylmethacrylate, etc. Among the monovinyl hydrocarbons suitable for use in forming the copolymers are those containing 8 to 12 carbon atoms and including styrene, alpha methylstyrene, vinyl toluene, t-butylstyrene and chlorostyrene. When such monovinyl hydrocarbons are employed, they should constitute less than 50 weight percent of the copolymer. Other monomers such as vinyl chloride, acrylonitrile, methacrylonitrile, and vinyl acetate may be included in the copolymer as modifying monomers. However, when employed, these modifying monomers should constitute only between about 0 and about 30 weight percent of the monomers in the copolymer.

As mentioned above, the film forming material may contain both hydroxy functionality and a material which reacts in situ to form hydroxy functionality. Exemplary of one such film forming material would be a material which consists essentially of a single copolymer bearing both hydroxy and epoxy functionality, the epoxy functionality reacting with the acid functionality of the hydroxy functional organophosphate ester as discussed above to form hydroxy functionality which thereafter may also react with the amino crosslinking agent. Such a difunctional copolymer may be of the acrylic type similar to the hydroxy functional copolymer discussed above. A preferred bifunctional copolymer of this type has a number average molecular weight ($\overline{M}_n$) of between about 1500 and about 10,000 and a glass transition temperature (Tg) of between about $-25°$ C. and about 70° C. Such a copolymer preferably is formed from between about 5 and 25 weight percent of monoethylenically unsaturated monomers bearing glycidyl functionality and between about 5 and about 25 weight percent of monoethylenically unsaturated monomers bearing hydroxy functionality, with the total of the monoethylenically unsaturated monomers bearing either said glycidyl functionality or said hydroxy functionality being not greater than 30 weight percent of the monomers in the copolymer. The remainder of the monomers in the copolymer, i.e., between about 90 and about 70 weight percent, consist of other monoethylenically unsaturated monomers, such as those described above.

Also as mentioned above, the film forming material may consist essentially of a compound which reacts in situ to form hydroxy functionality, i.e., a compound not initially including hydroxy functionality. Such a compound could be, for example, a copolymer such as those described above, but bearing only glycidyl functionality. Such a copolymer bearing pendant functionality would have a number average molecular weight ($\overline{M}_n$) of between about 1500 and about 10,000 in a glass transition temperature (Tg) of between about $-25°$ C. and about 70° C. A preferred copolymer of this type consists of between about 10 and about 30 weight percent of monoethylenically unsaturated monomers bearing glycidyl functionality and between about 90 and about 70 weight percent of other monoethylenically unsaturated monomers, as discussed above.

Still another compound bearing epoxy functionality which may be employed when solely epoxy functionality, which in turn will react with the acid functionality of the organophosphate ester to form hydroxy functionality, is desired is a polyepoxide resin having a number average molecular weight of between about 140 and about 3000. Such polyepoxide resin could be selected from aliphatic, cycloaliphatic and aromatic polyepoxides falling within the stated molecular weight range. Such polyepoxides are well known compositions and any of these may be employed. Among the many suitable types of polyepoxides are those disclosed by U.S. Pat. Nos. 3,404,018; 2,528,359; 2,528,360; 3,198,850; 3,960,979; and 4,018,848.

As also mentioned above, there may be those instances when the film forming material desirably comprises separate compounds, one or more bearing hydroxy functionality and one or more others bearing functionality which reacts in situ to form hydroxy functionality. Such film forming materials might, for example, consist of the above noted hydroxy functional copolymer combined with the epoxy functional copolymer discussed above or the polyepoxide resin discussed above. Various other combination of materials, of course, will be apparent to those skilled in the art. Still other film forming materials are exemplified in the detailed examples set forth hereinafter.

Amino Crosslinking Agent

Amino crosslinking agent suitable for crosslinking hydroxy functional bearing materials are well known in the art and their selection will be obvious to those skilled in the art. Typically, the crosslinking materials are products of reactions of melamine or urea with formaldehyde and various alcohols containing up to and including 4 carbon atoms. Among the numerous materials which may be employed are the amine aldehyde resins such as condensation products of formaldehyde with melamine, substituted melamine, urea, benzoquanamine or substituted benzoguanamine. Preferred members of this class are methylated melamineformaldehyde resin such as hexamethyoxymethyl-melamine. These liquid crosslinking agents have substantially one hundred percent (100%) nonvolatile content as measured by the foil method at 45° C. for 45 minutes. Some particularly well known crosslinking agents are the amino resins sold by American Cyanamid under the trademark "Cymel". In particular, Cymel 301, Cymel 303, and Cymel 1156, which are alkylated melamine-formaldehyde resins are useful in compositions falling within the scope of this invention.

Of course, the amount of crosslinking agent employed in any given composition is a matter of choice depending upon the final properties desired and the nature of the other materials in the coating composition.

Other Materials

Of course, it should be recognized that coating compositions within the scope of this invention may include other conventional components. These include, but are not limited to, antioxidants, U.V. absorbers, solvents, surface modifiers, wetting agents, pigments, fillers, etc.

The invention will be further understood by referring to the following detailed examples. It should be understood that the specific examples are presented by way of illustration and not by way of limitation. Unless otherwise specified, all references to "parts" are intended to mean parts by weight.

EXAMPLE 1

(a) In a three-necked round bottom flask equipped with a stirrer, dropping funnel and a thermometer are placed five hundred (500) grams of dry (dried over molecular sieves) 2-ethyl-1,3hexane-diol. Phosphorus pentoxide is added portionwise with continuous stirring and an exothermic reaction occurs. The addition of phosphorus pentoxide is regulated to maintain the temperature at 50° C. Test portions of the reaction mixture are withdrawn at short intervals of time and titrated with potassium hydroxide solution. The addition of $P_2O_5$ is continued until the acid equivalent weight reaches about 280. The reaction mixture is stirred at 50° C. for one more hour and then filtered. Its acid equivalent weight, by titration with KOH solution, is 271.

(b) A hydroxy acrylic copolymer is prepared from the following monomers:

|                      | Wt/grams | Wt. % |
|----------------------|----------|-------|
| Hydroxyethyl acrylate | 400      | 20    |
| Methylmethacrylate   | 400      | 20    |
| Styrene              | 200      | 10    |
| Butyl methacrylate   | 1000     | 50    |

One hundred (100) grams tert-butyl perbenzoate is added to the above monomer mixture and the resulting solution added dropwise over a period of two hours to 1600 grams of refluxing (145°) methy amyl ketone (under nitrogen). The heating and stirring is continued for half an hour after the addition is complete and then five (5) grams of tert-butyl perbenzoate are added portionwise to the reaction mixture. The reaction mixture is refluxed for an additional ninety minutes and then allowed to cool to room temperature. The molecular weight is determined by Gel Permeation Chromatography: $\overline{M}_n = 2,540$, $\overline{M}_w/\overline{M}_n = 1.94$ Calculated $T_g = 27°$ C.

Theoretical solids = 60%
Determined solids = 59.2%
Viscosity, #4 Ford Cup = 44 sec.
Hydroxy equivalent weight = 980

Fifty (50) parts of the polymer solution (b) are mixed with twenty (20) parts of Cymel 301 (American Cyanamid) and ten (10) parts of butyl acetate. One part of hydroxy phosphate (a) is added to the above solution and the resulting formulation is spray applied to primed steel test panels in three coats. The panels were baked at 120° C. for 15 minutes to obtain hard, glossy coatings with excellent solvent (xylene and methyl amyl ketone) resistance.

EXAMPLE 2

Three hundred fifty (350) parts of $TiO_2$ are mixed with 350 parts of Acryloid OL-42 (Rohm and Haas Chemical Company) and 25 parts of butyl acetate. The above mixture is taken up in a porcelain bottle containing porcelain beads and put on a roller mill for 16 hours. Thirty parts of this mill base are mixed with 20 parts of hydroxy polymer from example 1(b), 15 parts of Cymel 301, two parts of hydroxy phosphate from example 1(a) and eleven parts of butylacetate. The resulting formulation is spray applied to primed steel panels and is cured at 110° C. for 20 minutes to obtain coatings with excellent physical properties.

EXAMPLE 3

Eighty (80) parts of acrylic copolymer solution described in Example 1(b) are mixed with 40 parts of Araldite CY 178 and 50 parts of Cymel 301. This mixture is dissolved in 30 parts of butyl acetate and 46 parts of hydroxy phosphate prepared in Example 1(a) are added to it. The resulting solution is stirred for one minute and then spray applied to primed steel panels. The panels are baked at 120° C. for 20 minutes to obtain hard clear coatings with excellent hardness, adhesion, gloss and solvent (xylene and methyl ethyl ketone) resistance. After 14 days in a Cleveland Humidity Chamber panels show no loss of gloss and no peeling, blistering or discoloration.

EXAMPLE 4

One hundred grams of carboxyterminated polybutadiene rubber (Hycar CTBN 1300×8) are mixed with 100 grams of Araldite CY178 and 25 ml. of butylacetate. Two grams of Cordova Accelerator AMC-2 are dissolved in 25 ml. butylacetate and are added to the reaction mixture. The reaction mixture was stirred at 50° C. for 15 hours.

Three parts of the above adduct, 7 parts of Araldite CY178 and 9 parts Cymel 301 are dissolved in 10 parts of butylacetate. 8.9 parts of hydroxy phosphate from Example 1(a) (eq. wt. 271 are added to the above solution and the resulting formulation is applied to unpolished steel test panels. The panels are heated at 140° C. for 30 minutes to obtain a moisture resistant and corrosion inhibiting coating.

EXAMPLE 5

One hundred (100) grams of 1,4-cyclohexanedimethanol are dissolved in 80 grams of butyl acetate at 50° C. and the procedure outlined in Example 1(a) followed to obtain a hydroxy phosphate with acid equivalent weight of 645.

Twenty (20) parts of the polymer solution from Example 1(b) are mixed with 11.6 parts of Araldite CY178, 18 parts of Cymel 301 and 5 parts of butyl acetate. The hydroxy phosphate described above, 34, 7 parts, is added to the above solution and the resulting formulation applied by spraying to primed steel test panels. The panels are baked at 125° C. for 20 minutes to obtain a coating with excellent gloss, hardness, adhesion and solvent (xylene and methyl ethyl ketone) resistance.

EXAMPLE 6

(a) Hydroxyphosphate is prepared by following the procedure described in Example 1(a) to obtain an acid equivalent weight of 485.

(b) In a round-bottom four-necked flask, equipped with a stirrer, a dropping funnel, a thermometer and a condenser, 500 ml. of methyl amyl ketone is brought to reflux under nitrogen. The following mixture of monomers is employed for polymer synthesis:

|  | Weight/grams | Wt. % |
| --- | --- | --- |
| Butyl methacrylate | 127.5 | 17 |
| Ethylhexyl acrylate | 180 | 24 |
| Glycidyl methacrylate | 195 | 26 |
| Methyl methacrylate | 210 | 28 |
| Styrene | 37.5 | 5 |

Thirty-seven (37) grams of tert-butyl perbenzoate is added to the above monomers and the resulting solution added dropwise to refluxing methyl amyl ketone over a period of one hour and ten minutes. The heating and stirring is continued for half an hour after the addition is complete and then two more grams t-butyl perbenzoate are added portionwise. The reaction mixture is refluxed for two more hours and then allowed to cool to room temperature. The molecular weight of the copolymer is determined by Gel Permeation Chromatography and found to be $\overline{M}_n = 3250$ and $\overline{M}_w/\overline{M}_n = 2.2$. The calculated Tg of the polymer is 9° C. and the solution viscosity (#4 Ford cup) is 41 seconds.

Eighty (80) parts of the copolymer solution prepared in (b) and 40 parts of Cymel 301 are dissolved in 20 parts of butyl acetate and 44.5 parts of the hydroxy phosphate prepared in (a) are added to this solution. The resulting formulation is spray applied to steel test panels and the panels are baked at 130° C. for 20 minutes to obtain a glossy (81/20°) coating with excellent hardness, adhesion and solvent (xylene and methyl amyl ketone) resistance. The coating does not show any loss of gloss or adhesion after 14 days exposure in the Cleveland Humidity Chamber.

EXAMPLE 7

Five (5) parts of aluminum flakes (65% in naphtha are mixed well with 80 parts of the copolymer solution from Example 6(b). Thirty-nine (39) parts Cymel 301 and 30 parts of butyl acetate are added to the above mixture and the resulting material is filtered through a coarse filtering cloth. Forty-five (45) parts of hydroxy phosphate from Example 6(a) are added to the filtrate and the resulting formulation spray applied to primed steel test panels in a three-coat application. The intermediate flash time is one minute and the final flash is five minutes. The panels are baked at 115° C. for 20 minutes to obtain a silver metallic coating with excellent hardness, adhesion and solvent (xylene and methyl amyl ketone) resistance.

EXAMPLE 8

In a three-necked, round bottom, two liter flask, equipped with a stirrer, a condenser and a dropping funnel, 750 ml. of toluene is brought to reflux under nitrogen. The following mixture of monomers, containing 15 grams of 2,2'-azobis'(2-methylpropionitrile) dissolved in 50 ml acetone, is added dropwise to the refluxing toluene.

|  | Wt./Grams | Wt. % |
| --- | --- | --- |
| Butyl methacrylate | 150 | 50 |
| Glycidyl methacrylate | 45 | 15 |
| Hydroxypropyl methacrylate | 30 | 10 |
| Methyl methacrylate | 60 | 20 |
| Styrene | 15 | 5 |

The addition of the initiator and monomer solution is completed in three hours. The reaction mixture is refluxed for half an hour more and 10 ml of acetone solution of 2 grams of the above initiator is added dropwise and the reaction mixture refluxed for half an hour. Part of the solvent is distilled out to bring the solids content to 66% by weight.

Twenty (20) parts of this polymer solution are mixed with 7 parts of Cymel 301 and the mixture dissolved in ten (10) parts of butyl acetate, 4.5 parts of hydroxy phosphate from Example 1(a) is added to the above solution and the resulting formulation drawn on a steel test panel. The panel is baked at 100° C. for 20 minutes to obtain a glossy (86/20°) panel with excellent hardness, adhesion and solvent (xylene and methyl ethyl ketone) resistance.

EXAMPLE 9

(a) A copolymer is prepared by following the procedure described in Example 8 in methyl amyl ketone at 125° C. and by using the following monomers:

|  | Wt. % |
| --- | --- |
| Butyl methacrylate | 50 |
| Ethylhexyl acrylate | 10 |
| Glycidyl methacrylate | 15 |
| Hydroxypropyl methacrylate | 10 |
| Methyl methacrylate | 10 |
| Styrene | 5 |

Tert-butyl peroctoate (5.25% of monomers) is used as initiator and determined solids content is 56.6% by weight. The calculated Tg of the copolymer is 25° C. and the molcular weight from Gel Permeation Chromatography is found to be $\overline{M}_n = 4220$ and $\overline{M}_w/\overline{M}_n = 1.90$.

(b) By following the procedure described in Example 1(a), hydroxy phosphate with an acid equivalent weight of 400 is prepared from phosphorus pentoxide and 2-ethyl-1,3 hexanediol.

A millbase is prepared by dispensing titanium dioxide in the polymer (a) with a high speed Cowl's blade. The composition of the millbase is: 15% polymer (100% nonvolatile), 65% titanium dioxide and 20% methyl amyl ketone. Seventy-two (72) parts of this millbase, 31 parts of the polymer, 12.5 parts of bis-(hydroxypropyl) azelate, 34 parts of Cymel 301 and 29 parts of methyl amyl ketone are taken up in a plastic bottle. Twelve (12) parts of hydroxy phosphate (equivalent weight 400), described under (b), are added to the above mixture and the resulting formulation spray applied to both primed and unprimed steel panels. The panels are baked at 120° C. for 20 minutes to obtain hard, glossy coatings with excellent adhesion. The coating has an excellent solvent and humidity resistance.

EXAMPLE 10

(a) By following the procedure described in Example 9(a) a copolymer is prepared from the following monomers:

|  | Wt. % |
| --- | --- |
| Butyl methacrylate | 60 |
| Glycidyl methacylate | 20 |
| Hydroxyethyl acrylate | 10 |
| Styrene | 10 |

The calculated Tg of the polymer is 25° C. and solids content is found to be 54.9% by weight. The molecular weight by Gel Permeation Chromatography is found to be $\overline{M}_n = 1809$ and $\overline{M}_w/\overline{M}_n = 2.44$.

(b) By following the procedure described in Example 1(a) a hydroxy phosphate with acid equivalent weight of 212 is prepared from phosphorus pentoxide and 2-ethyl-1,3 hexanediol.

As described in Example 9, a mill base is prepared from the following materials:

| Copolymer (a) | 21% (100% nonvolatile) |
| --- | --- |
| Titanium dioxide | 61% |
| Methyl amyl ketone | 18% |

Sixty-five (65) parts of this millbase, 26.4 parts polymer (a), 12.5 parts bis-(hydroxyl propyl) azelate, 24.9 parts Cymel 301 and 25 parts of methyl amyl ketone are taken up in a plastic bottle. Hydroxy phosphate (b) (Equivalent weight 212), 9.5 parts, is added to the above mixture and the resulting formulation spray applied to both primed and unprimed panels. The panels are baked at 120° C. for 20 minutes to obtain hard, glossy coatings with excellent adhesion and solvent resistance. The coatings, when put in a Cleveland Humidity Chamber for 14 days, do not show any deterioration in general physical properties.

EXAMPLE 11

Fifty (50) grams of 1,4-benzenedimethanol are dissolved in 150 grams of 2-ethyl-1,3-hexanediol and 40 ml. of butyl acetate. Phosphorus pentoxide is added to the above solution as described in Example 1(a) to obtain a hydroxyphosphate with an acid equivalent weight of 364.

Thirty (30) parts of the polymer solution from Example 8(a), 11 parts of Cymel 301, 2 parts of caprolactone based hydroxypolyester (PCPO 300, Union Carbide) are dissolved in 10 parts of butyl acetate. The above hydroxyphosphate (8.9 parts) is added to the above solution and the resulting formulation applied by spraying to primed steel test panels. The panels are baked at 130° C. for 20 minutes to obtain a hard, glossy coating with excellent adhesion and solvent (xylene and methyl ethyl ketone) resistance.

EXAMPLE 12

One hundred (100) grams of 1,4-cyclohexanedimethanol are dissolved in 80 grams of butyl acetate at 50° C. and the procedure outlined in Example 1(a) is followed to obtain a hydroxyphosphate with an acid equivalent weight of 645.

The procedure of Example 9 is modified by substituting 19.4 parts of the above hydroxyphosphate for the hydroxyphosphate used therein and three more parts of Cymel 301 are added to the formulation. The resulting paint is applied by spryaing to primed steel test panels and the panels baked at 130° C. for 20 minutes to obtain hard, glossy coatings with excellent adhesion and solvent (xylene and methyl ethyl ketone) resistance.

EXAMPLE 13

Hydroxy polymer is prepared as described in Example 1 with the only change that only 10 grams of tertbutyl perbenzoate is employed. Fifty (50) parts of this polymer solution are mixed with 20 parts of Beetle 80 (American Cyanamid), 40 parts of butylacetate and 2 parts of hydroxyphosphate from Example 1(a). The formulation is apray applied to primed steel panels and baked at 90° C. for 15 minutes to obtain a hard, glossy coating with excellent solvent (xylene and methyl amyl ketone) resistance.

EXAMPLE 14

Sixty (60) parts of the polymer from Example 13 are mixed with 4 parts of aluminum flakes (65% in naphtha), 18 parts of Cymel 301, 1.5 parts of hydroxyphosphate from Example 1, 30 parts butyl acetate and 10 parts acetone. The resulting formulation was spray applied in three coats to primed steel test panels. The panels were baked at 110° C. for 15 minutes to obtain silver metallic coating with excellent physical properties.

EXAMPLE 15

Seventy-five (75) parts of acrylic copolymer described in Example 13 are mixed with 40 parts of Araldite CY178, 41 parts of Cymel 301 and 75 parts of butylacetate. Forty-seven (47) parts of hydroxyphosphate prepared in Example 1(a) are added to it and the resulting formulation is spray applied to primed steel test panels. The panels are baked at 90° C. for 20 minutes to obtain hard, clear coatings with excellent adhesion, gloss and solvent (xylene and methyl ethyl ketone) resistance.

EXAMPLE 16

Six (6) parts of aluminum flakes (65% in naphtha) are mixed well with 70 parts of the polymer solution from Example 6(b). Forty-nine (49) parts Cymel 301, 20 parts of polymer from Example 13 and 75 parts of butyl acetate are added to the above mixture and the resulting material is filtered through a coarse filtering cloth. Twenty-five (25) parts of hydroxy phosphate from Example 1(a) are added to the filtrate and the resulting formulation spray applied to primed steel test panels in a three-coat application; the intermediate flash time is one minute and the final flash five minutes. The panels are baked at 115° C. for 20 minutes to obtain silver metallic coatings with excellent hardness, adhesion and solvent (xylene and methyl ethyl ketone) resistance.

EXAMPLE 17

By following the procedure described in Example 9(a), a copolymer is prepared in refluxing tolene from the following monomers:

|                         | Wt. % |
|-------------------------|-------|
| Butyl methacrylate      | 55    |
| Ethylhexyl acrylate     | 20    |
| Glycidyl methacrylate   | 5     |
| Hydroxypropyl methacrylate | 10 |
| Styrene                 | 10    |

One thousand (1000) grams of the total monomers, 900 ml. toluene and 10 grams of tert-butyl peroctoate are used.

Seventy-five (75) parts of this polymer solution, 23 parts Cymel 301 and 4.2 parts of hydroxy phosphate from Example 1 are dissolved in 70 parts of butylacetate. This formulation is spray applied in three coats to primed panels which are baked at 110° C. for 15 minutes to obtain coating with excellent physical properties.

In view of this disclosure, many modifications of this invention will be apparent to those skilled in the art. It is intended that all such modifications which fall within the true scope of this invention be included within the terms of the appended claims.

I claim:

1. A thermosetting coating composition comprising a film forming component and an amine aldehyde compound, which composition cures by reaction between said amine aldehyde compound and hydroxy functionality present on said film forming material, which hydroxy functionality is either initially present, generated in situ, or both initially present and generated in situ, the improvement comprising including in said composition a catalyst for said reaction comprising at least one hydroxy functional organophosphate ester having the formula:

wherein n=1 to 2 and R is selected from the group consisting of mono- or dihydroxy alkyl, cycloalkyl or aryl radicals.

2. A composition in accordance with claim 1 wherein said film forming material consists essentially of a compound bearing hydroxy functionality.

3. A composition in accordance with claim 2 wherein said film forming material has a number average molecular weight of at least 150.

4. A composition in accordance with claim 2 wherein said film forming material consists essentially of a copolymer bearing pendant hydroxy functionality, having a number average molecular weight ($\overline{M}_n$) of between about 1000 and about 20,000 and a glass transition temperature (Tg) of between about $-25°$ C. and about 70° C., said copolymer consisting of between about 5 and about 30 weight percent of monoethylenically unsaturated monomers bearing hydroxy functionality and between about 95 and about 70 weight percent of other monoethylenically unsaturated monomers.

5. A coating composition in accordance with claim 1 wherein said film forming material consists essentially of a compound which reacts in situ during cure of said composition to form hydroxy functionality.

6. A coating composition in accordance with claim 5 wherein said reaction in situ forms substantially all of the crosslinking functionality in said film forming material.

7. A coating composition in accordance with claim 5 wherein said film forming material includes hydroxy functionality in addition to that which is formed by said reaction in situ.

8. A coating composition in accordance with claim 5 wherein said compound bears epoxy functionality which reacts with said organophosphate ester during cure of said composition to form hydroxy functionality which, in turn, reacts with said amine aldehyde compound.

9. A coating composition in accordance with claim 1 wherein said film forming material consists essentially of a compound bearing both epoxy and hydroxy functionality.

10. A coating composition in accordance with claim 1 wherein said film forming material consists essentially of a mixture of a compound bearing hydroxy functionality and a compound bearing epoxy functionality.

* * * * *